June 28, 1960  J. E. HAWKINS  2,943,320
RADIO LOCATION SYSTEM
Filed Oct. 4, 1955  4 Sheets-Sheet 1

Fig. 1.

INVENTOR.
James E. Hawkins
BY
Mason, Kolehmainen, Rathburn & Wyss
Attys.

June 28, 1960  J. E. HAWKINS  2,943,320
RADIO LOCATION SYSTEM
Filed Oct. 4, 1955  4 Sheets-Sheet 3

Fig. 4.

INVENTOR.
James E. Hawkins
BY
Mason, Kolehmainen,
Rathburn & Wyss
Attys

Fig. 6.

INVENTOR.
James E. Hawkins
BY
Mason, Kolehmainen,
Rathburn & Wyss
Attys.

United States Patent Office 2,943,320
Patented June 28, 1960

2,943,320

RADIO LOCATION SYSTEM

James E. Hawkins, Broken Arrow, Okla., assignor to Seismograph Service Corporation, Tulsa, Okla., a corporation of Delaware Filed Oct. 4, 1955, Ser. No. 538,348

24 Claims. (Cl. 343—105)

The present invention relates to radio position finding systems and more particularly to improvements in radio position finding systems employing phase comparison in pairs of position indication signals radiated from a plurality of spaced transmitting points to provide indications from which the position of a mobile receiving point relative to the known positions of the transmitting points may be determined.

In systems of the particular type referred to, the continuous waves radiated from each pair of transmitters produce standing waves in space, the phase relationship of which changes as a function of changing position between the two transmitting points. More specifically, the waves radiated by each pair of transmitting units of the system are characterized by isophase lines which are hyperbolic in contour about the transmitting points as foci. On a line bisecting the pair of transmitters, these isophase lines are spaced apart a distance equal to one-half the mean wave length of the radiated waves and have diverging spacings at points on either side of this line. With this system arrangement, the position of a receiving point relative to a pair of hyperbolic isophase lines may be determined by measuring the phase relationship between continuous waves radiated from the pair of transmitters.

Since the point of location of the receiving point along the zone separating the two isophase lines is not indicated by such a phase measurement, it becomes necessary to employ at least three spaced transmitters, different pairs of which function to provide a grid-like pattern of intersecting hyperbolic lines, in order to obtain absolute determination of the position of the receiving point. Systems of the character described are exceedingly accurate insofar as the position indications produced at the receiving point are concerned. To obtain the desired indication accuracy, however, it is necessary to maintain phase synchronization between the continuous waves radiated by the spaced transmitters, or alternatively, so to arrange the system that phase shifts between the radiated waves are compensated during the phase comparing operation.

Phase synchronization of the waves radiated from the plurality of transmitters presents an exceedingly difficult problem which has been the subject of considerable development work. All solutions which have been found for this problem involve the use of relatively elaborate and somewhat delicate instrumentation not well adapted for the continuity of service required in position determining systems. To obviate this problem, systems of the continuous wave hyperbolic type have been proposed (see Honore Patent No. 2,148,267, issued February 21, 1939) in which the phase shift problem is obviated by heterodyning the carrier waves of each pair of transmitters at a fixed link transmitting point, and modulating the difference frequency component of the heterodyned waves as a reference signal upon the carrier output of the link transmitter for radiation to the receiving point, where the difference frequency component is detected and phase compared with a difference frequency signal derived by directly heterodyning the transmitted continuous waves at the receiving point. In this manner, phase shifts between the continuous waves radiated from the two transmitters are completely compensated so that the measured phase angle is truly representative of the location of the receiving point between a pair of isophase lines.

While the described arrangement for obviating the phase synchronization problem is entirely satisfactory, it entails the use of two carrier channels in addition to the three or four channels taken up by the three or four continuously operating survey transmitters, in order to make up a complete system. It is desirable, however, that the channel frequencies employed be located adjacent the broadcast band or at least below the ultra-high frequency band in order to obviate the problem of line-of-sight transmission, which of course necessitates the location of a number of channel frequencies in the most crowded portion of the frequency spectrum, at least insofar as operations in the United States are concerned. Since frequency allocations in this band must be maintained at a minimum, it would be highly desirable to provide a system of the type described above wherein all of the signals radiated from the spaced transmitters fall within a single frequency channel. While there have been many prior attempts to achieve such a system, these have invariably resulted in failure due to the difficulty involved in separating the various signals to facilitate their identification. Among these prior unsuccessful attempts to solve the above problem, was the suggestion that the frequencies of the transmitters be located approximately 10 kilocycles apart near the upper and lower extremities of the allocated frequency channel. However, such arrangements are generally unsatisfactory in that a few cycles of frequency drift cause the radiated signals to overlap into the adjacent channels usually allocated to another user.

It is an object of the invention therefore to provide an improved radio location system of the continuous wave type which is free of phase synchronization difficulties of the character mentioned and in which the number of frequency channels employed is reduced to an absolute minimum.

It is another object of the present invention to provide an improved radio location system of the continuous wave type which provides precise position determinations while employing only a single channel frequency.

Still another object of the invention is to provide a radio position indicating system of the character described wherein position indications are obtained while employing a minimum number of carrier frequencies suitable for efficient long-range propagation.

It is likewise an object of the present invention to provide improved transmission systems for use in radio location systems of the above-indicated character.

It is also an object of the invention to provide improved receiving equipment for use in radio location systems of the above-indicated character.

The invention both as to its organization and method of operation, together with further objects and advantages thereof, will best be understood by reference to the specification, taken in connection with the accompanying drawings, in which.

Figure 1:
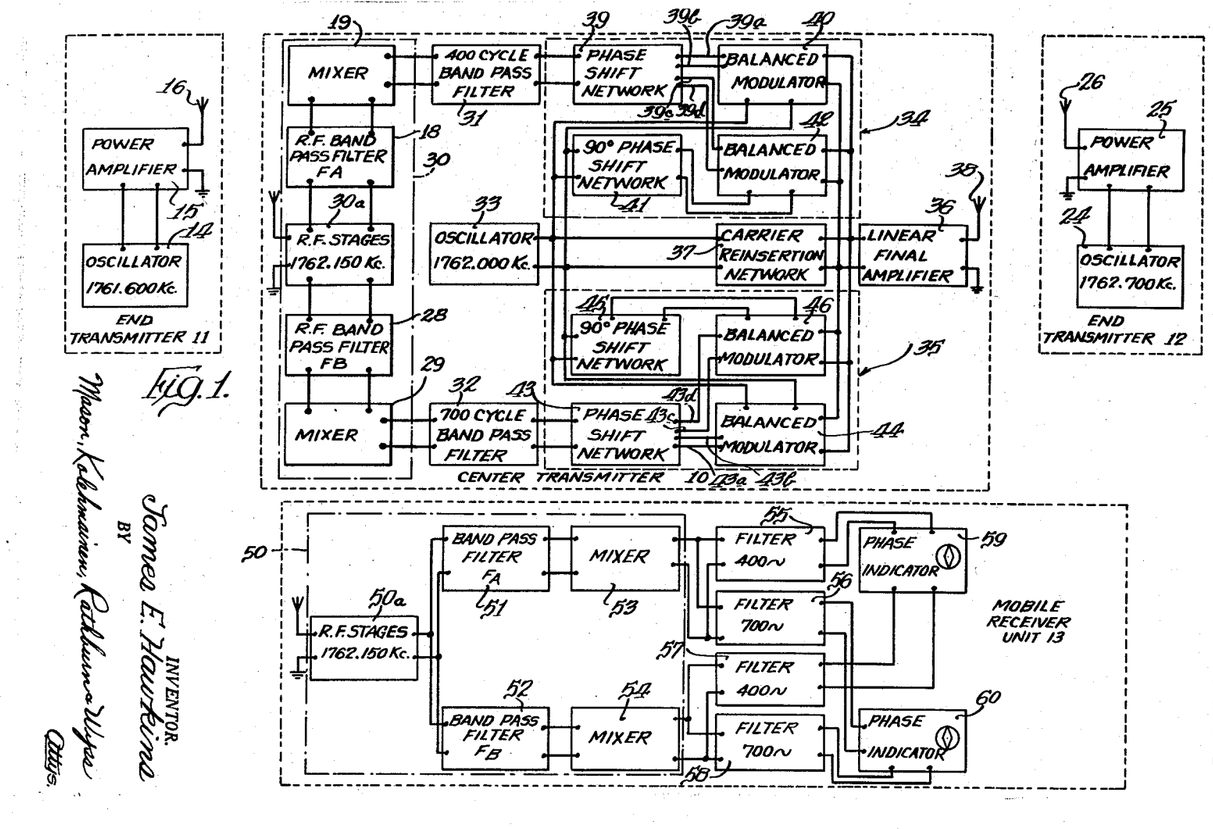
Fig. 1 is a diagrammatic representation of a three-foci position indicating system embodying the present invention.

Referring now to Fig. 1 of the drawings, the invention is illustrated as embodied in a three foci, hyperbolic, continuous wave system for providing position information at any number of mobile receiving units 13 which may be carried by vessels or vehicles operating within the radius of transmission of a plurality of spaced transmitters or transmitting units 10, 11 and 12. These units are preferably spaced apart approximately equal distances and are so positioned that the base line joining the points of location of the units 10 and 11 is angularly related to the line joining the points of location of the units 10 and 12 and, as a result, the transmitter 10 may be termed the center transmitter while the transmitters 11 and 12 are termed end transmitters. As is described more fully hereinafter, the end transmitting units 11 and 12 are equipped continuously to radiate position indicating signals in the form of carrier waves of different frequencies while the center transmitting unit 10 is equipped continuously to radiate position indicating signals and reference signals in the form of a carrier wave having superimposed thereon modulation components of different frequency. Specifically, the end transmitter 11 comprises a continuously operative oscillator 14 for generating signals having a frequency of 1761.600 kilocycles and a power amplifier 15 for amplifying the generated signals and applying the same for space radiation from an emitting antenna 16. Similarly, the end transmitter 12 comprises a continuously operative oscillator or signal generating means 24 for developing signals having a frequency of 1762.700 kilocycles together with a power amplifier 25 for amplifying the developed signals and applying the same to a radiating antenna 26.

The equipment provided at the center transmitter 10 includes an oscillator 33 for developing radio frequency signals of 1762.000 kilocycles for radiation from the center transmitter together with a receiver 30 center tuned to a frequency of 1762.150 kilocycles for receiving the carrier waves radiated from the end transmitters 11 and 12 as well as the carrier wave and upper and lower side band signals radiated from the center transmitter 10 in a manner described more fully hereinafter. It is the function of the receiver 30 to heterodyne selected ones of the accepted carrier waves in pairs of develop across its output terminals beat frequency signals for modulating the carrier wave generated by the oscillator 33. To this end, the receiver 30 comprises one or more radio frequency stages 30a tuned to a center frequency of 1762.150 kilocycles so as to accept the waves radiated from the end transmitters 11 and 12 together with the modulated signal radiated from the center transmitter 10. To separate the accepted radio frequency signals, the output signals from the stages 30a are applied to a pair of highly selective radio frequency band pass filters 18 and 28 which, in turn, feed the non-linear mixer and detecting stages 19 and 29 of the receiver 30. Each of the mixers 19 and 29 heterodynes in pairs the radio frequency signals applied thereto and produces a plurality of beat frequency signals. To separate the developed beat frequency signals and to eliminate all except one of these signals, the output terminals of mixers 19 and 29 are respectively connected to a pair of band pass filters 31 and 32, respectively tuned to pass audio frequency signals of 400 and 700 cycles. Thus, the band pass filter 31 passes the 400 cycle output signal developed by the receiver 30 as a result of heterodyning the carrier waves radiated by the transmitters 10 and 11 while the band pass filter 32 is designed to pass the 700 cycle signal developed by the receiver 30 as a result of heterodyning the carrier waves radiated by the transmitters 10 and 12. The filters 18 and 28 and the low frequency filters 31 and 32 cooperate to prevent the development or passage of all other difference frequencies between the radio frequency signals accepted by the stages 30a.

The audio signal passed by the filter 31 and the radio frequency signals developed by the oscillator 33 are applied to a single side band-suppressed carrier generator of conventional construction, indicated generally as 34, which functions to develop the upper side band of the two signals supplied thereto and to eliminate both the radio frequency carrier and the lower side band. In similar manner, the output of the band pass filter 32 and the radio frequency signals developed by the oscillator 33 are applied to a single side band-suppressed carrier generator, indicated generally as 35, which functions to develop the lower side band of the two input signals and to eliminate both the radio frequency carrier and the upper side band signal. The signals developed by both of the single side band generators 34 and 35 are applied to a linear signal transmission channel including a linear final amplifier 36 and which may also include a linear mixer (not shown). The construction and operation of this linear signal transmission to effect the radiation of a plurality of radio frequency signals from a single antenna without generating intermodulation components between the radiated signals is described and claimed in the copending application of William R. Hunsicker, Serial No. 425,271, filed April 23, 1954, now Patent No. 2,872,676, issued February 3, 1959, and assigned to the same assignee as the present invention. The linear signal transmission channel is also excited by the signals from the oscillator 33 applied thereto through a carrier reinsertion network 37 with the result that the final amplifier 36 passes all three of the radio frequency signals applied to its input terminals to a single radiating antenna 38 in order simultaneously and continuously to radiate the same from the center transmitter 10.

The single side band generators 34 and 35 may be of the general type described on pages 294 and 295 of "The Radio Amateur's Handbook" published in 1953 by the American Radio Relay League. Thus, the single side band generator 34 includes a phase shift network 39 for dividing the 400 cycle audio signal from the filter 31 into identical components displaced 90 degrees in phase and respectively appearing between the pairs of signal connectors 39a—39b and 39c—39d. The audio component appearing between the connectors 39a and 39b is applied to a balanced modulator 40 which is also excited by the radio frequency signals generated by the oscillator 33. In order to provide radio frequency signals which are displaced by 90 degrees in phase from the output signals of the oscillator 33, the latter output signals are applied to a 90 degree phase shift network 41 in the side band generator 34. The latter phase shift network develops signals for application to one of the sets of signal input terminals of a balanced modulator 42, a second set of signal input terminals of which is excited by the audio signal appearing between connectors 39c and 39d. The balanced modulators 40 and 42 function in a conventional manner to eliminate or suppress the carrier frequency originating at the oscillator 33 and, at the same time, the relative phases of the side bands are such that the lower side band is balanced out while the upper side band is accentuated in the combined output of the balanced modulators to develop a signal having a frequency of 1762.400 kilocycles. Similarly, the single side band generator 35 comprises a phase shift network 43 for developing components of the 700 cycle audio signal from the filter 32 which are displaced in phase by 90 degrees and which respectively appear between the pairs of signal connectors 43a—43b and 43c—43d. The audio signal appearing between the connectors 43a and 43b is applied to one set of signal input terminals of a balanced modulator 44, the other set of signal input terminals of which is excited by the radio frequency signals developed by the oscillator 33. A 90 degree phase shift network 45 develops a radio frequency signal which is 90 degrees displaced in phase from the signal appearing at the output of the oscillator 33 and applies this phase displaced signal to one set of signal input terminals of a balanced modulator 46, the other set of signal input terminals of which is excited by the audio signal appearing between signal connectors 43c and 43d. The balanced modulators 44 and 46 function to suppress or eliminate the carrier or radio frequency signal and at the same time the phases of the side bands are such that the upper side band is balanced out and eliminated and the lower side band is accentuated in the combined output of the balanced modulators. Thus, the single side band generator 35 functions to develop a signal having a frequency of 1761.300 kilocycles which is applied to the input terminals of the linear signal transmission channel including the final amplifier 36.

In order to effect the radiation of a position indicating signal from the center transmitter 10 simultaneously with the radiation of the two single side bands developed by the generators 34 and 35, the signal output of the oscillator 33 is applied through a carrier reinsertion network 37 to the signal input terminals of the linear signal transmission channel including the final amplifier 36. Thus, the latter amplifier is simultaneously and continuously excited by the carrier frequency of 1762.000 kilocycles from the carrier reinsertion network 37, by the single side band signal having a frequency of 1762.400 kilocycles from the single side band generator 34 and by the single side band having a frequency of 1761.300 kilocycles from the single side band generator 35. As indicated above, the linear final amplifier 36 functions to amplify all three of these signals without generating undesired spurious responses or intermodulation components between the input signals in order to effect the radiation of position indicating and reference signals from the radiating antenna 38. The band pass filters 18 and 28 may be of any type having a relatively narrow frequency response curve characterized by a nearly flat top with steep attenuations on both sides of the pass band. One type of filter which will afford satisfactory results is decribed in the March 1953 issue of "Electronics" in an article by M. L. Doelz and J. C. Hathaway, entitled "How To Use Mechanical I. F. Filters." In any event, the filters 18 and 28 are designed to have frequency response characteristics represented by the graph illustrated in Fig. 2 wherein the attenuation of the filters is plotted as a function of frequency, the dotted line curve being representative of the frequency response of the filter 18 and the solid line curve being representative of the frequency response of the filter 28. In considering these curves it should be observed that an attenuation by the filters 18 or 28 of about 40 decibels of the signal passed by the stages 30a renders the attenuated signals incapable of affecting the operation of the center transmitter 10. In other words, for an effective elimination of signals appearing at the output of the radio frequency stages 30a about a 40 decibel attenuation is required.

Figure 2:
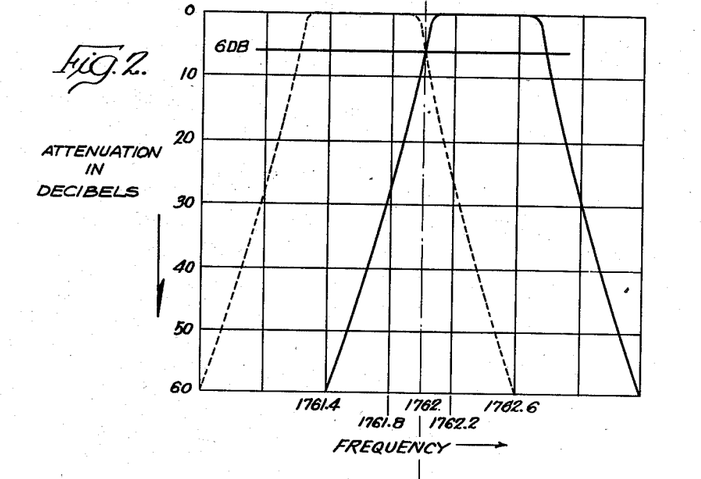
Fig. 2 is a graph illustrating the frequency response characteristics of the band pass filters employed in the receiving equipment shown in Fig. 1.
Figure 3:
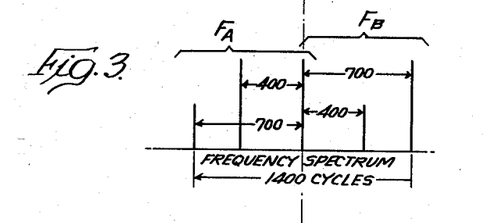
Fig. 3 illustrates the relationship of the frequencies radiated by the transmitting equipment shown in Fig. 1.

It will be observed by reference to Fig. 2 that the center of the pass band for the filter 18 is approximately 800 cycles lower than the center of the pass band for the filter 28. To facilitate the ensuing description the 1761.600 kilocycles signal radiated by the end transmitter 11, the 1762.000 kilocycle signal radiated from the center transmitter 10 and the single side band signal of 1761.300 kilocycles radiated from the center transmitter will be considered to comprise a group of signals designated as $F_A$ as shown in Fig. 3. The 1762.700 kilocycle signal radiated from the end transmitter 12, the 1762.000 kilocycle signal radiated from the center transmitter 10 and the single side band signal of 1762.400 kilocycles radiated from the center transmitter will be considered to comprise a second frequency group designated as $F_B$ and illustrated in Fig. 3. It will be observed by reference to Fig. 3 that a total frequency separation of only 1400 cycles exists between all of the signals radiated by the transmitters 10, 11 and 12 and, as a consequence, all of these signals fall well within a single 10 kilocycle frequency channel without danger of overlap or drift into the next adjacent channel. It is the function of the band pass filter 18 to pass the radio frequency signals of group $F_A$ and to eliminate the signals of group $F_B$ while the band pass filter 28, on the other hand, functions to eliminate the signals of group $F_A$ and pass the signals of group $F_B$.

Referring again to Fig. 2, it will be observed that the filter 18 provides substantially no attenuation to either 1761.600 kilocycle signal from the end transmitter 11 or to the single side band signal of 1761.300 kilocycles from the center transmitter 10. A slight attenuation in the order of 6 decibels is afforded for the relatively strong 1762.000 kilocycle signal received from the center transmitter 10. However, since such an attenuation does not eliminate this signal, the latter is passed to the mixer 19 to perform the functions described below. Obviously, the filter 18 provides an attenuation in excess of 40 decibels for the signal received from the end transmitter 12 and for the single side band of 1762.400 kilocycles received from the center transmitter 10 with the result that the amplitude of the signals appearing at the output of the filter 18 is insufficient to disturb the operation of the mixer 19 and, hence, these signals are effectively eliminated.

Similarly, the filter 28 provides substantially no attenuation to the signal received from the end transmitter 12 or to the single side band signal of 1762.400 kilocycles received from the center transmitter 10. Slight attenuation is again provided for the 1762.000 kilocycle signal received from the center transmitter but again such attenuation is insufficient to eliminate this particular signal. An attenuation in excess of 40 decibels is provided by the filter 28 for the signal received from the end transmitter 11 and for the single side band of 1761.300 kilocycles received from the center transmitter with the result that both of these signals are effectively eliminated.

From the foregoing description, it will be apparent that the output of the band pass filter 18 comprises the 1761.600 kilocycle signal from the end transmitter 11, the 1762.000 kilocycle signal from the center transmitter 10 and the single side band signal of 1761.300 kilocycles from the center transmitter and, hence, the filter 18 has effectively eliminated the signals of group $F_B$. The three radio frequency signals passed by the filter 18 are supplied to the mixer 19 which functions to heterodyne these signals in pairs in order to develop beat frequency signals for application to the band pass filter 31. Thus, the 1761.600 kilocycle signal from the end transmitter 11 and the 1762.000 kilocycle signal from the center transmitter 10 are heterodyned by the mixer 19 to produce a 400 cycle signal which is passed by the filter 31. Both the 700 cycle beat frequency between the 1762.000 kilocycle signal from the center transmitter 10 and the single side band of 1761.300 kilocycles from the same transmitter and the 300 cycle beat frequency signal between the 1761.600 kilocycle signal from end transmitter 11 and the side band signal of 1761.300 kilocycles from the center transmitter 10 are rejected by the filter 31 and, hence, have no effect upon the operation of the equipment.

In similar manner, the three radio frequency signals passed by the filter 28 are heterodyned in pairs by the mixer 29 in order to develop beat frequency signals having frequencies corresponding to the audio frequency differences between the heterodyned pairs. In order to separate the beat frequency signals developed by the mixer 29, the latter are applied to the input terminals of band pass filter 32. The beat frequency signal of 700 cycles between the 1762.000 kilocycle signal received from the center transmitter 10 and the 1762.700 kilocycle signal received from the end transmitter 12 is passed by the filter 32. Both the 400 cycle beat frequency signal between the 1762.000 kilocycle signal from the center transmitter 10 and the side band signal of 1762.400 kilocycles received from the same transmitter and the 300 cycle beat frequency signal between the 1762.700 kilocycle signal from the end transmitter 12 and the side band signal of 1762.400 kilocycles from the center transmitter 10 are rejected by the filter 32 and, hence, do not affect the operation of the center transmitter. The 400 cycle signal passed by the filter 31 and the 700 cycle passed by the filter 32 are respectively applied to the single side band generators 34 and 35 for modulation upon the signal developed by the oscillator 33 in the manner previously described.

The mobile receiver unit 13 is adapted to respond to the radio frequency signals continuously radiated from each of the end transmitters 11 and 12 and to the position indicating and reference signals radiated from the center transmitter 10 by providing a pair of position indications representative of the location of the mobile receiver unit relative to the transmitters 10 and 11 and to the transmitters 10 and 12. To this end, the mobile receiver unit 13 includes a receiver 50 which, in turn, comprises one or more radio frequency stages 50a center tuned to a frequency of 1762.150 kilocycles for receiving all of the signals radiated from the transmitters 10, 11 and 12, a pair of radio frequency band pass filters 51 and 52 for separating the received signals, and a pair of non-linear mixers 53 and 54 respectively responsive to the signals passed by the filters 51 and 52. The mobile receiver unit 13 further comprises a plurality of audio frequency band pass filters 55, 56, 57 and 58 for separating the signals produced by the mixers 53 and 54 and a pair of phase indicators responsive to the signals passed by the audio frequency filters for providing the desired position indications.

The band pass filters 51 and 52 are respectively identical to the filters 18 and 28 described above and possess frequency responsive characteristics as shown in Fig. 2. Thus, the filter 51 functions to pass the signals of group $F_A$ and to eliminate the signals of group $F_B$ while the filter 52 eliminates the signals of group $F_A$ and passes the signals of group $F_A$. Specifically, the filter 51 passes the 1761.600 kilocycle signal received by the radio frequency stages 50a from end transmitter 11 together with both the 1762.000 kilocycle carrier wave and the 1761.300 kilocycle side band signal received from the center transmitter and rejects the 1762.700 kilocycle signal received from the end transmitter 12 and the 1762.400 kilocycle side band from the center transmitter. The filter 52 passes the 1762.700 kilocycle signal from the end transmitter 12 together with both the 1762.000 kilocycle carrier wave and the 1762.400 kilocycle side band received from the center transmitter 10 and rejects the 1761.600 kilocycle signal from end transmitter 11 and the 1761.300 kilocycle signal from the center transmitter. The three radio frequency signals passed by the filter 51 are supplied to the mixer 53 where they are heterodyned in pairs in order to develop a plurality of beat frequency signals for application to the band pass filters 55 and 56. Thus, the 1761.600 kilocycle signal from the end transmitter 11 and the 1762.000 kilocycle signal from the center transmitter 10 are heterodyned by the mixer 53 to produce a 400 cycle signal which is passed by the filter 55 but is rejected by the filter 56. The 700 cycle beat frequency between the 1762.000 kilocycle carrier wave and the 1761.300 kilocycle side band received from the center transmitter is passed by the filter 56 but is, of course, rejected by the filter 55. The 300 cycle beat frequency between the 1761.600 kilocycle signal from end transmitter 11 and the side band signal of 1761.300 kilocycles from the center transmitter 10 is rejected by both of the filters 55 and 56.

In similar manner, the three radio frequency signals passed by the filter 52 are heterodyned in pairs by the mixer 54 in order to develop a plurality of beat frequency signals for joint application to band pass filters 57 and 58. The beat frequency of 700 cycles between the 1762.000 kilocycle signal received from the center transmitter 10 and the 1762.700 kilocycle signal from the end transmitter 12 is passed by the filter 58 and rejected by the filter 57. The 400 cycle beat frequency between the 1762.000 kilocycle carrier wave and the 1762.400 kilocycle side band received from the center transmitter 10 is passed by the filter 57 and rejected by the filter 58. The 300 cycle beat frequency between the 1762.700 kilocycle signal from the end transmitter 12 and the side band signal of 1762.400 kilocycles from the center transmitter 10 is rejected by both of the filters 57 and 58. The 400 cycle signal passed by the filter 55 is applied to one set of signal input terminals of the phase indicator 59 while, at the same time, the 400 cycle signal passed by the filter 57 is applied to the other set of signal input terminals of this phase meter. As will be recognized by those skilled in this art and particularly from an understanding of the heterodyne principle disclosed and claimed in the Patent No. 2,148,267 to Honore, the phase meter 59 provides an indication which is continuously representative of the position of the mobile receiver unit 13 along a hyperbolic isophase line having foci at the transmitters 10 and 11.

To provide a second position indication in order to establish a position fix, the 700 cycle signal passed by the filter 56 is applied to one set of signal input terminals of the phase indicator 60 while, at the same time, the 700 cycle signal passed by the filter 58 is applied to the other set of signal input terminals of this phase indicator. The phase indicator 60 measures the phase relationship between the signals applied to its two sets of signal input terminals and provides an indication representative of the location of the mobile receiver unit 13 along a hyperbolic isophase line having foci at the transmitters 10 and 12. The intersection of the two hyperbolic isophase lines identified by the phase indicators 59 and 60, of course, defines the position of the mobile receiver unit 13. To resolve ambiguity of the position indications provided by the indicators 59 and 60, the latter may be equipped with a rotor carrying thereon an element which indexes with a circular scale to indicate the phase relationships between the impressed input signals together with a revolution counter mechanically driven from the rotor element of each meter. The indications of the counters thus identify and count the number of complete revolutions of the indicating elements of the phase meters 59 and 60 with the result that the number of isophase lines of both sets of hyperbolas, i.e., the set of hyperbolas having foci at the transmitters 10 and 11 and the set of hyperbolas having foci at the transmitters 10 and 12, traversed by the mobile receiver unit 13 are continuously counted. In view of the foregoing detailed description, it is believed that the operation of the transmitting and receiving equipment illustrated in Fig. 1 will be well understood by those skilled in the art without further description.

Figure 4:
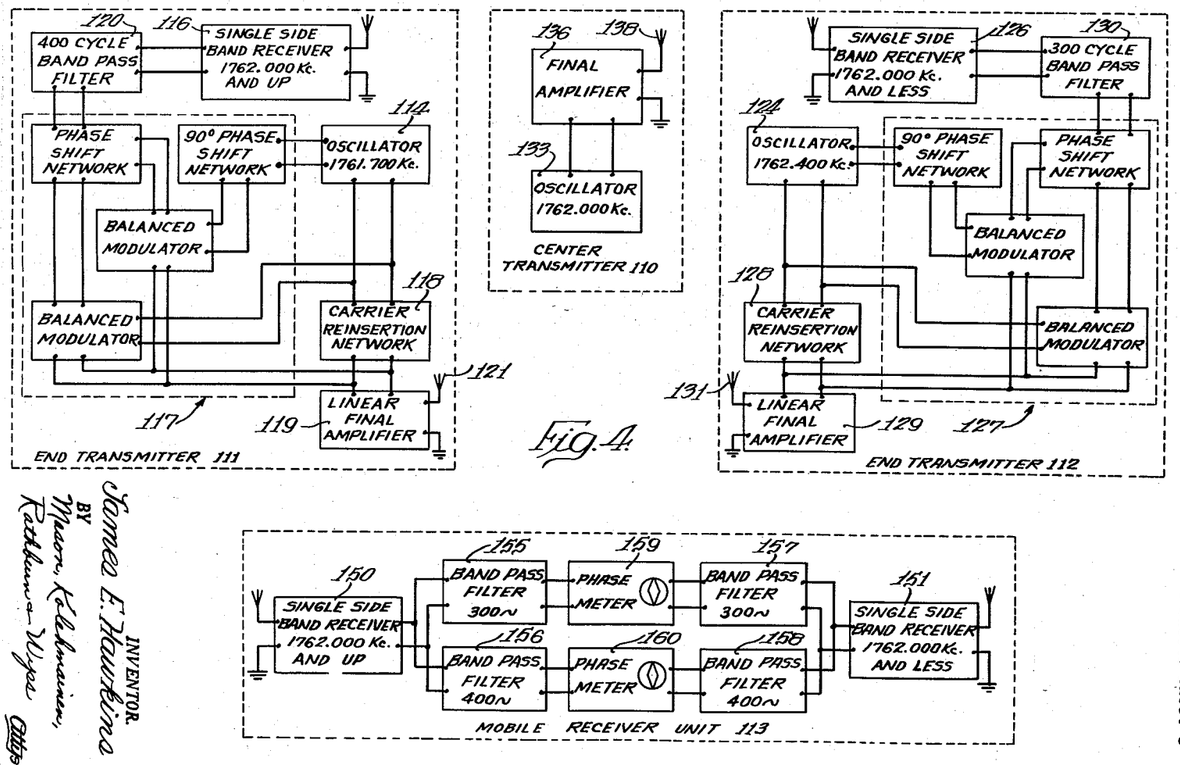
Fig. 4 is a diagrammatic illustration of an alternative arrangement of the transmitting and receiving equipment of the present invention.

An alternative arrangement of the radio location system of the present invention is illustrated in Fig. 4 wherein the end transmitters are employed as the modulated transmitters or reference signal radiators in a single side band system. Specifically, in the apparatus illustrated in Fig. 4, three spaced transmitters or transmitting units 110, 111 and 112 are again provided. The center transmitter 110 functions continuously to radiate a position indicating signal in the form of an unmodulated or pure carrier wave while each of the end transmitters 111 and 112 radiates a position indicating signal together with a reference signal in the form of a single side band of the position indicating signal.

The equipment provided at the center transmitter 110 comprises an oscillator 133 for generating radio frequency signals having a frequency of 1762.000 kilocycles together with a final amplifier 136 for amplifying the generated signals and applying the same to a radiating antenna 138. The equipment provided at the end transmitter 111 comprises an oscillator 114 for generating signals having a frequency of 1761.700 kilocycles, a single side band receiver 116, a band pass filter adapted to pass 400 cycle beat frequency signals developed by the receiver 116, a single side band-suppressed carrier generator 117 of the type described above responsive to the signal from the oscillator 114 and to the audio signal passed by the filter 120 for developing the lower side band of these two signals and for eliminating both the carrier and the upper side band, a carrier reinsertion circuit 118 for supplying signals from the oscillator 114 to a linear signal transmission channel including a linear final amplifier 119 which functions to supply not only the signal from the carrier reinsertion circuit 118, but also the single side band developed by the side band generator 117 to a radiating antenna 121. Thus, the end transmitter 111 functions continuously to radiate the 1761.700 kilocycle signal developed by the oscillator 114 together with a lower side band of this signal having a frequency of 1761.300 kilocycles.

Similarly, the end transmitter 112 comprises an oscillator 124 for developing radio frequency signals having a frequency of 1762.400 kilocycles, a single side band receiver 126, a band pass filter 130 designed to pass beat frequency signals, developed by the receiver 126, having a frequency of 300 cycles, a single side band-suppressed carrier generator indicated generally as 127 and responsive to the signal output of the oscillator 124 and to the audio signals passed by the band pass filter 130 for developing the upper side band of these signals and for suppressing both the carrier and the lower side band, a carrier reinsertion circuit 128 for applying signals from the oscillator 124 to a linear signal transmission channel including a linear final amplifier 129 simultaneously with the single side band developed by the generator 127 in order to effect the simultaneous emission from a radiating antenna 131 of the 1762.400 kilocycle signal developed by the oscillator 124 together with the upper side band of 1762.700 kilocycles developed by the generator 127.

Referring now to the operation of the transmitting system described above, it will be observed that the single side band receiver 116 at the end transmitter 111 is designed to accept all signals having frequencies equal to or greater than 1762.000 kilocycles, but does not respond to signals lower than 1762.000 kilocycles. Thus, the receiver 116 responds to the 1762.000 kilocycle signal from the center transmitter 110, to the 1762.400 kilocycle signal from the end transmitter 112 and to the 1762.700 kilocycle single side band signal from the end transmitter 112. All three of these signals are heterodyned in pairs in order to develop at the output terminals of receiver 116 a 300 cycle beat frequency signal resulting from heterodyning the two waves from end transmitter 112, a 400 cycle beat frequency signal resulting from heterodyning the 1762.000 kilocycle wave from the center transmitter 110 with the 1762.400 kilocycle signal from the end transmitter 112 and a 700 cycle beat frequency signal resulting from heterodyning the 1762.000 kilocycle wave from the center transmitter 110 with the 1762.700 kilocycle single side band from the end transmitter 112. The band pass filter 120 rejects the 300 and 700 cycle beat frequency signals and passes the 400 cycle signal to the single side band-suppressed carrier generator 117. The generator 117 functions in a manner similar to the single side band generators 34 and 35 previously described to develop the lower side band of 1761.300 kilocycles. As previously mentioned, the latter signal is applied to the linear signal transmission channel including linear final amplifier 119 simultaneously with the application of the output signal of the carrier reinsertion circuit 118, thereby to effect the simultaneous radiation of signals having frequencies of 1761.700 and 1761.300 kilocycles from the end transmitter 111. Since the receiver 116 does not respond to the two signals continuously radiated from the end transmitter 111, the latter have no effect on the operation of the receiver 116. Similarly, the single side band receiver 126 at the end transmitter 112 accepts signals having frequencies equal to or less than 1762.000 kilocycles but does not respond to signals having frequencies in excess of 1762.000 kilocycles. Thus, the receiver 126 accepts the 1762.000 kilocycle wave from the center transmitter 110 and both of the waves radiated from the end transmitter 111 having frequencies of 1761.700 and 1761.300 kilocycles, respectively. The three waves effective at the receiver 126 are heterodyned in pairs in order to develop 300, 400 and 700 cycle beat frequency signals for application to the band pass filter 130. The latter rejects the 400 and 700 cycle signals and passes the 300 cycle signal to the single side band-suppressed carrier generator 127. The latter generator, which is also excited by the radio frequency signal output from the oscillator 124, develops the upper side band having a frequency of 1762.700 kilocycles and applies the same to the linear signal transmission channel including the linear final amplifier 129 simultaneously with the signal from the carrier reinsertion circuit 128. Thus, the end transmitter 112 functions continuously to radiate a position indicating signal having a frequency of 1762.400 kilocycles and an upper side band signal having a frequency of 1762.700 kilocycles.

The signals from the transmitters 110, 111 and 112 are radiated to a mobile receiver unit 113 where the signals are separated and applied to a pair of phase indicators 159 and 160 in order to produce position indications in the manner previously described. Specifically, the mobile receiver unit 113 comprises a single side band receiver 150 responsive to signals having frequencies equal to or greater than 1762.000 kilocycles, a single side band receiver 151 responsive to signals having frequencies equal to or less than 1762.000 kilocycles, a pair of band pass filters 155 and 156 for separating the signals developed by the receiver 150, a pair of band pass filters 157 and 158 for separating the signals developed by the receiver 151, and the phase meters or indicators 159 and 160. The receiver 150 responds to the 1762.000 kilocycle signal from the center transmitter 110 and to both of the signals from the end transmitter 112 having frequencies of 1762.400 and 1762.700 kilocycles. The two signals from the end transmitter 111, each having a frequency less than 1762.000 kilocycles, have no effect on the receiver 150. The receiver 150 heterodynes in pairs the three waves to which its responds and develops a 300 cycle beat frequency signal as a result of heterodyning the two waves from the end transmitter 112, a 400 cycle beat frequency signal as a result of heterodyning the 1762.000 kilocycle wave from the center transmitter 110 and the 1762.400 kilocycle signal from the end transmitter 112 and a 700 cycle beat frequency signal as a result of heterodyning the 1762.000 kilocycle signal from the center transmitter 110 and the 1762.700 kilocycle single side band signal from the end transmitter 112. The 700 cycle beat frequency signal is rejected by both of the band pass filters 155 and 156 and hence, has no effect on the operation of the mobile receiver unit 113. The 300 cycle beat frequency signal is rejected by the band pass filter 156 but is passed by the filter 155 to the left hand set of signal input terminals of the phase meter 159. The 400 cycle beat frequency signal is rejected by the band pass filter 155 but is passed by the filter 156 to the left hand set of signal input terminals of the phase meter 160.

Similarly, the receiver 151 responds to the signal from the center transmitter 110 and to the two signals from the end transmitter 111, but neither of the signals from the end transmitter 112, both of which possess frequencies in excess of 1762.000 kilocycles are effective at the receiver 151. The receiver 151 heterodynes the 1762.000 kilocycle signal from the center transmitter 110 with the 1761.700 kilocycle signal from the end transmitter 111 to produce a 300 cycle beat frequency signal, heterodynes the 1762.000 kilocycle signal from the center transmitter 110 with the 1761.300 kilocycle signal from the end transmitter 111 to produce a 700 cycle beat frequency signal, and heterodynes the two signals received from the end transmitter 111 to produce a 400 cycle beat frequency signal. The 700 cycle beat frequency signal is rejected by both of the band pass filters 157 and 158 and, hence, does not disturb the operation of the mobile receiver unit 113. The band pass filter 157 rejects the 400 cycle signal and passes the 300 cycle signal to the right hand set of signal input terminals of the phase meter 159. At the same time, the filter 158 functions to reject the 300 cycle signal and to pass the 400 cycle signal to the right hand set of signal input terminals of the phase meter 160. Thus, the phase indicator 159 measures the phase relationship between the 300 cycle signal exciting its opposite sets of signal input terminals and provides an indication representative of the location of the mobile receiver unit 113 relative to the transmitters 110 and 111, while the phase meter 160 measures the phase relationship between the 400 cycle excitation signals and, hence, identifies a hyperbolic isophase line passing through the mobile receiver location and having foci at the transmitters 110 and 112. Obviously, the signals radiated from the transmitters 110, 111 and 112 could, if desired, be separated and translated into position indications by a mobile receiver unit of the type shown in Fig. 1 employing highly selective radio frequency band pass filters to effect the required separation.

Figure 5:
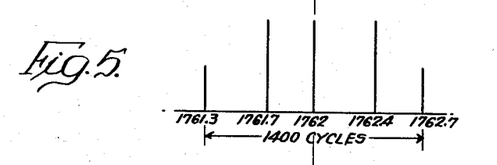
Fig. 5 illustrates the frequency relationship between the signals radiated from the transmitters shown in Fig. 4.

The frequency relationship between the signals radiated from the transmitters 110, 111 and 112 is illustrated in Fig. 5 from which it will be observed that all of the radiated signals again fall within a 1400 cycle frequency band. Hence, these signals occupy only a single channel frequency and there is no danger of overlap or frequency drift into the adjacent channels.

Figure 6:
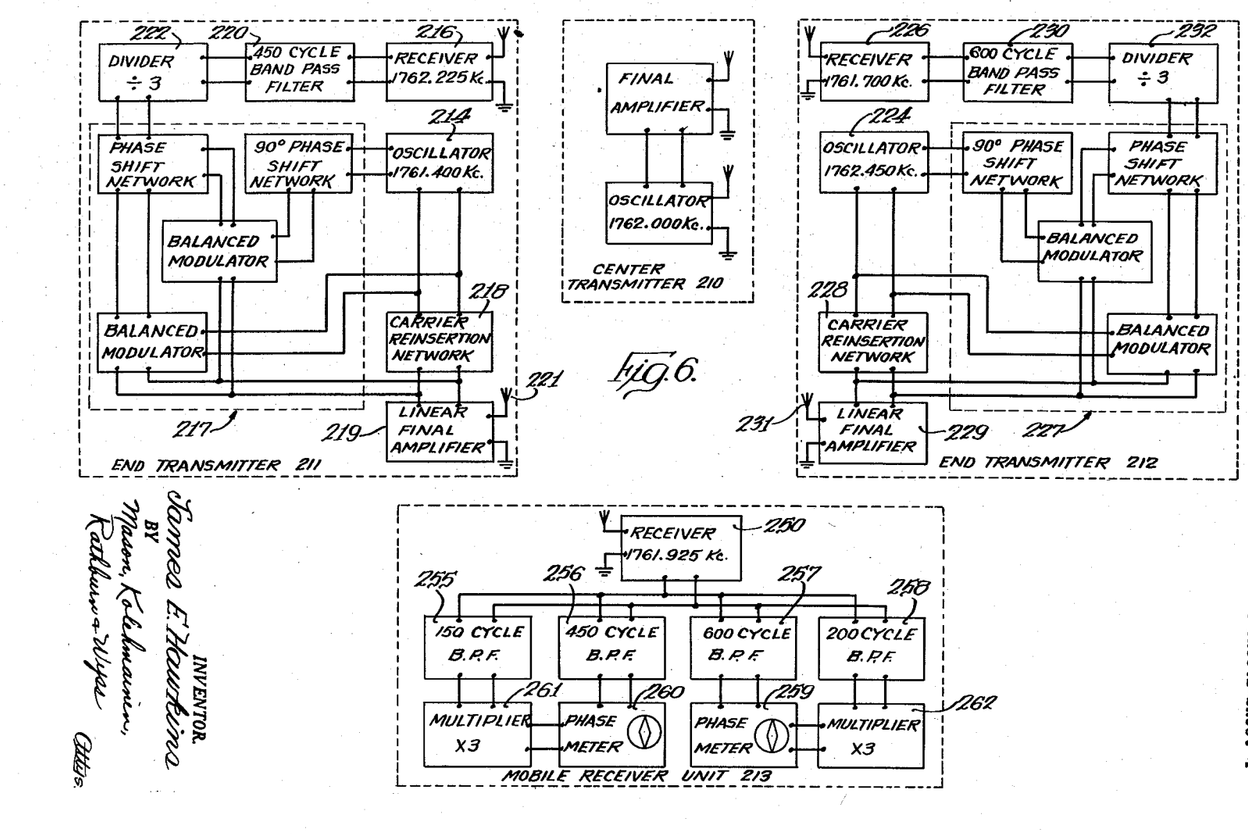
Fig. 6 is a diagrammatic representation of still another arrangement of the apparatus of the present invention.

Still another arrangement of the apparatus of the present invention is illustrated in Fig. 6 wherein the use of that narrow radio frequency band pass filters at the mobile receiver unit is avoided. Thus, the equipment there illustrated comprises three spaced transmitters 210, 211, and 212 for radiating signals which may be transformed into position indications by any number of mobile receiver units 213 capable of receiving these signals. The transmitting portion of the system comprises a center transmitter 210 identical with the transmitter 110 described above and a pair of end transmitters 211 and 212. The end transmitter 211 comprises an oscillator 214 for developing radio frequency signals of 1761.400 kilocycles, a receiver 216 responsive to all of the waves radiated from the transmitters 210, 211 and 212, a 450 cycle band pass filter 220, a divider 222 for dividing the frequency of the signal passed by the filter 220, a single side band-suppressed carrier generator indicated generally as 217 responsive to the signals developed by the oscillator 214 and to the signals produced by the divider 222 for generating the lower side band of these two signals and for eliminating both the radio frequency carrier and the upper side band, a linear signal transmission channel including a linear final amplifier 219 responsive to the signals developed by the generator 217 and to the signals from the oscillator 214 applied thereto through a carrier reinsertion network 218 for effecting the simultaneous radiation of the two radio frequency input signals from a radiating antenna 221.

The end transmitter 212 comprises an oscillator 224 for generating radio frequency signals having a frequency of 1762.450 kilocycles, a receiver 226 designed to receive the signals radiated by all of the transmitters 210, 211 and 212, a 600 cycle band pass filter 230, a divider 232 for dividing the frequency of the signals passed by the band pass filter 230, a single side band-suppressed carrier generator 227 jointly responsive to the signals for the oscillator 224 and to the audio signals from the divider 232 for developing the upper side band signal and for eliminating both the radio frequency carrier and the lower side band signal, a linear signal transmission channel including a linear final amplifier 229 jointly responsive to the signals developed by the generator 227 and to the signal output of the oscillator 224 applied through a carrier reinsertion network 228 for effecting the simultaneous radiation of both of these signals from a radiating antenna 231.

Referring now to the operation of the transmitting portion of the system shown in Fig. 6, it will be observed that the receiver 216 at the end transmitter 211 receives the radio frequency wave from the center transmitter 210, both of the radio frequency signals radiated from the end transmitter 211 and both of the radio frequency signals radiated from the end transmitter 212. The receiver 216 develops the heterodyne signals between each pair of these five waves and applies the resulting beat frequencies to the band pass filter 220. The filter 220 functions to reject all of the developed heterodyne signals except the 450 cycle beat frequency signal resulting from the heterodyning of the 1762.000 kilocycle signal from the center transmitter 210 and the 1762.450 kilocycle signal from the end transmitter 212. This 450 cycle signal is passed through the divider 222 where the frequency is reduced to 150 cycles and it is thereafter applied as audio signal energization for the single side band-suppressed carrier generator 217. As previously indicated the latter generator is also energized by the signals emanating from the oscillator 214. As previously mentioned, the generator 217 functions in a manner similar to the generators 34 and 35 described above to develop the lower side band of the audio signal from divider 222 and the radio frequency signal from the oscillator 214 and to eliminate both the carrier wave and the upper side band. Thus, the single side band generator 217 supplies a radio frequency signal of 1761.250 kilocycles to the linear final amplifier 219 while the latter amplifier is also energized by the signals from oscillator 214 passed through the carrier reinsertion network 218. The linear signal transmission channel including the linear final amplifier 219 passes both of the applied input signals without generating undesired intermodulation components in order to effect simultaneous radiation from the transmitter 211 of a 1761.400 kilocycle signal and the 1761.250 kilocycle single side band signal developed by the generator 217.

Figure 7:
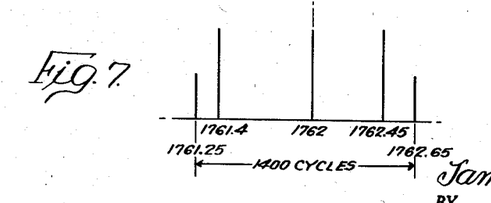
Fig. 7 illustrates the relationship of the frequencies radiated by the transmitting equipment shown in Fig. 6.

At the end transmitter 212, the receiver 226 responds to the position indicating signal radiated by the signal transmitter 210, to both of the radio frequency signals radiated from the end transmitter 211 and to the two radio frequency signals emanating from the end transmitter 212 by heterodyning all of these signals in pairs in order to develop the beat frequencies therebetween. All of the developed beat frequency signals are passed to the band pass filter 230 which functions to reject all except the 600 cycle beat frequency signal resulting from heterodyning the 1762.000 kilocycle signal radiated by the center transmitter 210 and the 1761.400 kilocycle position indicating signal radiated by the end transmitter 211. This 600 cycle beat frequency signal is passed through the filter 230 to the divider 232 in order to reduce its frequency to 200 cycles. The resulting 200 cycle frequency is applied to the single side band generator 227 simultaneously with the radio frequency signals from the oscillator 224. The generator 227 functions in a manner similar to the generators 34 and 35 described above to develop the upper side band of the two input signals and to suppress both the carrier and the lower side band. This upper side band signal, having a frequency of 1762.650 kilocycles, is applied to the linear signal transmission channel including the linear final amplifier 229 simultaneously with the signals from the oscillator 224 passing through the carrier reinsertion network 228. The linear final amplifier 229 amplifies both the input signals applied thereto without generating undesired intermodulation components with the result that both of these radio frequency signals are simultaneously and continuously radiated from the end transmitter 212. The relationship of the frequencies of the waves radiated from the transmitters 210, 211 and 212 is illustrated in Fig. 7. Thus, it will be readily apparent that all of the radiated waves are separated by only 1400 cycles of frequency with the result that all of these waves fall well within a single ten kilocycle frequency channel.

The mobile receiver unit 213 includes a receiver 250 which responds to all of the waves radiated from the center transmitter 210 and the end transmitters 211 and 212 by heterodyning these waves in pairs to develop the beat frequencies therebetween. The resulting beat frequencies are applied to the signal input terminals of a plurality of audio frequency band pass filters 255, 256, 257 and 258. The beat frequency between the 1761.400 and 1761.250 kilocycle waves radiated from the end transmitter 211 produces a 150 cycle signal for passage through the filter 255 to a multiplier 261 where the frequency of the 150 cycle input signal is increased to 450 cycles for application to one of the sets of signal input terminals of a phase meter 260. The band pass filter 255 functions to reject all of the other beat frequency signals developed by the receiver 250. The 450 cycle beat frequency signal between the wave radiated from the center transmitter 210 and the 1762.450 kilocycle position indicating signal radiated from the end transmitter 212 is passed through the band pass filter 256 directly to the other set of signal input terminals of the phase meter 260. Obviously, the band pass filter 256 functions to reject all of the beat frequency signals developed by the receiver 250 with the exception of the 450 cycle signal described above. From the foregoing description, it will be apparent that the opposed signal input terminals of the phase meter 260 are excited by signals of identical frequency and the indication appearing thereon represents and identifies a hyperbolic isophase line passing through the location of the mobile receiver unit 213 and having foci at the transmitters 210 and 212.

To provide a second position indication indicative of the location of the mobile receiving unit relative to the transmitters 210 and 211, the 600 cycle beat frequency signal between the 1762.000 kilocycle wave radiated from the center transmitter 210 and the 1761.400 kilocycle signal radiated from the end transmitter 211 is passed through the filter 257 to one set of signal input terminals of the phase meter 259. To provide a reference signal for phase comparison with this 600 cycle signal, the 200 cycle beat frequency signal developed by the receiver 250 as a result of heterodyning the two radio frequency waves radiated from the end transmitter 212 is passed through the band pass filter 258 to a multiplier 262 where the frequency of the applied input signal is increased to 600 cycles for application to the second set of signal input terminals of the phase meter 259. The latter phase meter measures the phase relationship between the two signals impressed across its opposed sets of signal input terminals and produces an indication representative of the location of the mobile receiver unit 213 along a hyperbolic isophase line having foci at the transmitters 210 and 211. The intersection of the two hyperbolic isophase lines identified by the phase meters 259 and 260 defines the position of the mobile receiver unit 213. The filters 257 and 258 are designed to reject all of the signals developed by the receiver 250 except those described above.

From the foregoing description, it will be observed that in all of the described arrangements of the radio location system of the present invention, the radiated frequencies fall within a relatively narrow frequency band of considerably less than 2000 cycles and, accordingly, it is apparent that in all of these arrangements a practical, single frequency channel, radio position finding system is effected without danger of frequency overlap into adjacent channels. Moreover, it will be observed that the equipment provided to effect the desired results is relatively simple in design and, hence, may be inexpensively constructed.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed as new and desired to be secured by Letters Patent of the United States is:

1. In a signal transmission system for use in radio position finding systems of the hyperbolic continuous wave type, the combination of first, second and third spaced apart transmitting units for respectively radiating first, second and third position indicating signals of different frequency, said first and second signals being separated by a first audio frequency difference, said second and third signals being separated by a second audio frequency difference, means for heterodyning said first and second signals in order to develop a first beat frequency signal, means for modulating one of said position indicating signals with a first reference signal derived from said first beat frequency signal and for eliminating one of the side bands of the resulting modulation, whereby said one position indicating signal and the remaining side band are radiated, means for heterodyning said second and third signals to develop a second beat frequency signal, and means for modulating one of said position indicating signals with a second reference signal derived from said second beat frequency and for eliminating one of the side bands of the resulting modulation, whereby the last mentioned position indicating signal and the remaining side band are radiated, all of said position indicating signals and both of said remaining side bands falling within a single ten kilocycle frequency channel.

2. The signal transmission system defined by claim 1 wherein both of said remaining side bands of the modulation components apepar upon the same position indicating signal.

3. The signal transmission system defined by claim 1 wherein said remaining side bands of the modulation components appear upon different ones of the position indicating signals.

4. The signal transmission system defined by claim 1 wherein the frequencies of said first reference signal and said first beat frequency signal are related by an integral multiple and wherein the frequencies of said second reference signal and said second beat frequency signal are also related by an integral multiple.

5. In a signal transmission system for use in radio position finding systems of the hyperbolic continuous wave type, the combination of first, second and third spaced apart transmitting units for respectively radiating first, second and third position indicating signals of different frequency, said first and second signals being separated by a first audio frequency difference, said second and third signals being separated by a second audio frequency difference, means for heterodyning said first and second signals in order to develop a first beat frequency signal, means for modulating one of said position indicating signals with a first reference signal derived from said first beat frequency signal and for eliminating the lower side band of the resulting modulation, whereby said one position indicating signal and the upper side band are radiated, means for heterodyning said second and third signals to develop a second beat frequency signal, and means for modulating one of said position indicating signals with a second reference signal derived from said second beat frequency and for eliminating the upper side band of the resulting modulation, whereby the last mentioned position indicating signal and its lower side band are radiated, all of said position indicating signals and both of the retained side bands falling within a single ten kilocycle frequency channel.

6. A radio position finding system of the hyperbolic continuous wave type, comprising a mobile receiving unit, first, second and third spaced apart transmitting units for respectively radiating first, second and third position indicating signals of different frequency, said first and second signals being separated by a first audio frequency difference, said second and third signals being separated by a second audio frequency difference, means for heterodyning said first and second signals in order to develop a first beat frequency signal, means for modulating one of said position indicating signals with a first reference signal derived from said first beat frequency signal and for eliminating one of the side bands of the resulting modulation, whereby said one position indicating signal and the remaining side band are radiated, means for heterodyning said second and third signals to develop a second beat frequency signal, means for modulating one of said position indicating signals with a second reference signal derived from said second beat frequency and for eliminating one of the side bands of the resulting modulation, whereby the last mentioned position indicating signal and the remaining side band are radiated, all of said position indicating signals and both of said remaining side bands falling within a single ten kilocycle frequency channel, and means at the mobile receiving unit responsive to all of the position indicating signals and to both of said remaining side bands for providing a pair of position indications representative of the location of the mobile receiving unit relative to different pairs of the transmitting units.

7. A radio position finding system of the hyperbolic continuous wave type comprising a mobile receiving unit, first, second and third spaced apart transmitting units for respectively radiating first, second and third position indicating signals of different frequency, said first and second signals being separated by a first audio frequency difference, said second and third signals being separated by a second audio frequency difference, means for heterodyning said first and second signals in order to develop a first beat frequency signal, means for modulating one of said position indicating signals with a first reference signal derived from said first beat frequency signal and for eliminating the lower side band of the resulting modulation, whereby said one position indicating signal and the upper side band are radiated, means for heterodyning said second and third signals to develop a second beat frequency signal, and means for modulating one of said position indicating signals with a second reference signal derived from said second beat frequency and for eliminating the upper side band of the resulting modulation, whereby the last mentioned position indicating signal and its lower side band are radiated, all of said position indicating signals and both of the remaining side bands falling within a single ten kilocycle frequency channel, and means at the mobile receiving unit responsive to all of the position indicating signals and to both of said remaining side bands for providing a pair of position indications representative of the location of the mobile receiving unit relative to different pairs of the transmitting units.

8. In a signal transmission system for use in radio position finding systems of the hyperbolic continuous wave type, the combination of first, second and third spaced apart transmitting units for respectively radiating first, second and third position indicating signals of different frequency, said first and second signals being separated by a first audio frequency difference, said second and third signals being separated by a second audio frequency difference, means for heterodyning said first and second signals in order to develop a first beat frequency signal, a carrier generator for developing one of said position indicating signals, means for modulating said one position indicating signal with a first reference signal derived from said first beat frequency signal and for eliminating both said one position indicating signal and one of the side bands of the resulting modulation, a carrier reinsertion circuit responsive to the signal developed by said carrier generator for producing said one position indicating signal, means responsive to the position indicating signal produced by the carrier reinsertion circuit and to the remaining side band developed by the modulating means for radiating said remaining side band and said one position indicating signal, means for heterodyning said second and third signals to develop a second beat frequency signal, means for modulating one of said position indicating signals with a second reference signal derived from said second beat frequency and for eliminating one of the side bands of the resulting modulation, and means for radiating the last mentioned position indicating signal and the remaining side band, all of said position indicating signals and both of said remaining side bands falling within a single ten kilocycle frequency channel.

9. In a signal transmission system for use in radio position finding systems of the hyperbolic continuous wave type, the combination of first, second and third spaced apart transmitting units for respectively radiating first, second and third position indicating signals of different frequency, said first and second signals being separated by a first audio frequency difference, said second and third signals being separated by a second audio frequency difference, means for heterodyning said first and second signals in order to develop a first beat frequency signal, a carrier generator for developing one of said position indicating signals, means for modulating said one position indicating signal with a first reference signal derived from said first beat frequency signal and for eliminating both said one position indicating signal and the upper side band of the resulting modulation, a carrier reinsertion circuit responsive to the signal developed by said carrier generator for producing said one position indicating signal, means responsive to the position indicating signal produced by the carrier reinsertion circuit and to the lower side band developed by the modulating means and to the output of the generator for radiating said lower side band and said one position indicating signal, means for heterodyning said second and third signals to develop a second beat frequency signal, means for modulating one of said position indicating signals with a second reference signal derived from said second beat frequency and for eliminating both the last mentioned position indicating signal and the lower side band of the resulting modulation, and means for reinserting and radiating the last mentioned position indicating signal and its upper side band, all of said position indicating signals and both of the retained side bands falling within a single ten kilocycle frequency channel.

10. A radio position finding system of the hyperbolic continuous wave type, comprising a mobile receiver unit, first, second and third spaced apart transmitting units for respectively radiating first, second and third position indicating signals of different frequency, said first and second signals being separated by a first audio frequency difference, said second and third signals being separated by a second audio frequency difference, means for heterodyning said first and second signals in order to develop a first beat frequency signal, a carrier generator for developing one of said position indicating signals, means for modulating said one position indicating signal with a first reference signal derived from said first beat frequency signal and for eliminating both said one position indicating signal and one of the side bands of the resulting modulation, a carrier reinsertion circuit responsive to the signal developed by said carrier generator for producing said one position indicating signal, means responsive to the position indicating signal produced by the carrier reinsertion circuit and to the remaining side band developed by the modulating means and to the output of the generator for radiating said remaining side band and said one position indicating signal, means for heterodyning said second and third signals to develop a second beat frequency signal, means for modulating one of said position indicating signals with a second reference signal derived from said second beat frequency and for eliminating one of the side bands of the resulting modulation, means for radiating the last mentioned position indicating signal and the remaining side band, all of said position indicating signals and both of said remaining side bands falling within a single ten kilocycle frequency channel, and means at said mobile receiver unit responsive to all of said position indicating signals and to said remaining side bands for providing a pair of position indications representative of the location of the mobile receiver unit relative to different pairs of the transmitting units.

11. A radio position finding system of the hyperbolic continuous wave type, comprising a mobile receiver unit, first, second and third spaced apart transmitting units for respectively radiating first, second and third position indicating signals of different frequency, said first and second signals being separated by a first audio frequency difference, said second and third signals being separated by a second audio frequency difference, means for heterodyning said first and second signals in order to develop a first beat frequency signal, a carrier generator for developing one of said position indicating signals, means for modulating said one position indicating signal with a first reference signal derived from said first beat frequency signal and for eliminating both said one position indicating signal and the upper side band of the resulting modulation, a carrier reinsertion circuit responsive to the signal developed by said carrier generator for producing said one position indicating signal, means responsive to the position indicating signal produced by the carrier reinsertion circuit and to the lower side band developed by the modulating means and to the output of the generator for radiating said lower side band and said one position indicating signal, means for heterodyning said second and third signals to develop a second beat frequency signal, means for modulating one of said position indicating signals with a second reference signal derived from said second beat frequency and for eliminating both the last mentioned position indicating signal and the lower side band of the resulting modulation, means for reinserting and radiating the last mentioned position indicating signal and its upper side band, all of said position indicating signals and both of the retained side bands falling within a single ten kilocycle frequency channel, and means at the mobile receiver unit jointly responsive to all of the position indicating signals and to both of the retained side bands for providing a pair of position indications representative of the location of the mobile receiver unit relative to different pairs of the transmitting units.

12. A signal transmission system for use in radio position finding systems of the hyperbolic continuous wave type which transmission system comprises at least three spaced apart transmitting units for radiating position indicating signals of different frequency, means for heterodyning the signals radiated from the first and second of said units to develop a first beat frequency signal and for heterodyning the signals from the second and the third of said units to develop a second beat frequency signal, means for transmitting first and second reference signals respectively derived from said first and second beat frequency signals in the form of modulation components appearing upon at least one of said position indicating signals while eliminating one of the side bands of each of the modulation components so that the remaining side band of each modulation component is transmitted, all of said position indicating signals and said remaining side bands having frequencies falling within a single ten kilocycle frequency channel.

13. The signal transmission system defined by claim 12 wherein both of said remaining side bands of the modulation components appear upon the same position indicating signal.

14. The signal transmission system defined by claim 12 wherein said remaining side bands of the modulating components appear upon different ones of the position indicating signals.

15. The signal transmission system defined by claim 12 wherein the frequencies of said first reference signal and said first beat frequency signal are related by an integral multiple and wherein the frequencies of the second reference signal and said second beat frequency are also related by an integral multiple.

16. A signal transmission system for use in radio position finding systems of the hyperbolic continuous wave type which transmission system comprises at least three spaced apart transmitting units for radiating position indicating signals of different frequency, means for heterodyning the signals radiated from the first and second of said units to develop a first beat frequency signal and for heterodyning the signals from the second and the third of said units to develop a second beat frequency signal, means for transmitting first and second reference signals respectively derived from said first and second beat frequency signals in the form of modulation components appearing upon at least one of said position indicating signals while eliminating the upper side band of one of the modulation components and the lower side band of the other modulation component so that the remaining side band of each modulation component is transmitted, all of said position indicating signals and said remaining side bands having frequencies falling within a single ten kilocycle frequency channel.

17. A signal transmission system of the hyperbolic continuous wave type which comprises at least three spaced transmitting units for radiating position indicating signals of different frequency, means for heterodyning the signals radiated from the first and second of said units to develop a first beat frequency signal and for heterodyning the signals from the second and the third of said units to develop a second beat frequency signal, and means for transmitting first and second reference signals respectively derived from said first and second beat frequency signals, said last named transmitting means including at least one wave signal generator for developing at least one of said position indicating signals, means for mixing the last named signal and said first reference signal to eliminate both said last named position indicating signal and one of the side bands resulting from the mixing while retaining the other side band, means including a carrier reinsertion circuit for radiating both said last named position indicating signal and said other side band, and means for modulating the second reference signal upon one of said position indicating signals to develop the last mentioned signal and only one of its side bands while eliminating the other side band, all of said position indicating signals and the retained side bands having frequencies falling within a single ten kilocycle frequency channel.

18. A signal transmission system of the hyperbolic continuous wave type which comprises at least three spaced apart transmitting units for radiating position indicating signals of different frequency, means for heterodyning the signals radiated from the first and second of said units to develop a first beat frequency signal and for heterodyning the signals from the second and the third of said units to develop a second beat frequency signal, and means for transmitting first and second reference signals respectively derived from said first and second beat frequency signals, said last named transmitting means including at least one wave signal generator for developing at least one of said position indicating signals, means for mixing the last named signal and said first reference signal to eliminate both said last named position indicating signal and the lower side band resulting from the mixing while retaining the upper side band, means including a carrier reinsertion circuit for radiating both said last named position indicating signal and said upper side band, and means for modulating the second reference signal upon one of said position indicating signals to develop the last mentioned signal and its lower side bands while eliminating the upper side band, all of said position indicating signals and the retained side bands having frequencies falling within a single ten kilocycle frequency channel.

19. In a signal transmission system of the hyperbolic continuous wave type, at least three spaced transmitting units for radiating position indicating signals of different frequency, signal generating means at each of said units, means at one of said units for heterodyning the signals radiated from two of said units in order to develop a beat frequency signal, single side band generating means at said one unit jointly responsive to said beat frequency signal and to the output of the signal generating means at said one unit for developing a single side band signal, a carrier re-insertion circuit responsive to said output for passing the output of the signal generating means at said one unit, and means for radiating from said one unit both said single side band signal and the signal passed by said carrier re-insertion circuit.

20. In a signal transmission system of the hyperbolic continuous wave type, at least three spaced transmitting units for radiating position indicating signals of different frequency, each pair of said signals being separated in frequency by a relatively small audio difference and all of said signals falling within a single transmission channel, signal generating means at each of said units for developing the signal radiated therefrom, means at one of said units for heterodyning the signals radiated from two of said units in order to develop a beat frequency signal, single side band generating means at said one unit jointly responsive to said beat frequency signal and to the output of the signal generating means at said one unit for developing a single side band signal, a carrier re-insertion circuit responsive to said output for passing the output of the signal generating means at said one unit, and means for radiating from said one unit both said single side band signal and the signal passed by said carrier re-insertion circuit.

21. A radio position finding system of the hyperbolic continuous wave type which comprises a mobile receiving unit, at least three spaced apart transmitting units for radiating position indicating signals of different frequency, means for heterodyning the signals radiated from a first and second of said units to develop a first beat frequency signal and for heterodyning the signals from the second and third of said units to develop a second beat frequency signal, means for transmitting to said mobile receiving unit first and second reference signals respectively derived from said first and second beat frequency signals in the form of modulation components appearing upon at least one of said position indicating signals while eliminating one of the side bands of each of the modulation components so that the remaining side band of each modulation component is transmitted, all of said position indicating signals and said remaining side band components falling within a single ten kilocycle frequency channel, and means at said mobile receiving unit jointly responsive to all three of said position indicating signals and to said remaining side band of each modulation component for providing a pair of position indications representative of the location of said mobile receiving unit relative to different pairs of said transmitting units.

22. A radio position finding system of the hyperbolic continuous wave type which comprises a mobile receiving unit, at least three spaced apart transmitting units for radiating position indicating signals of different frequency, means for heterodyning the signals radiated from a first and second of said units to develop a first beat frequency signal and for heterodyning the signals from the second and third of said units to develop a second beat frequency signal, means for transmitting to said mobile receiving unit first and second reference signals respectively derived from said first and second beat frequency signals in the form of modulation components appearing upon at least one of said position indicating signals while eliminating the upper side band of one of the modulation components and the lower side band of the other modulation component so that the remaining side band of each modulation component is transmitted, all of said position indicating signals and said remaining side band components falling within a single ten kilocycle frequency channel, and means at said mobile receiving unit jointly responsive to all three of said position indicating signals and to said remaining side band of each modulation component for providing a pair of position indications representative of the location of said mobile receiving unit relative to different pairs of said transmitting units.

23. A radio position finding system of the hyperbolic continuous wave type which comprises a mobile receiving unit, at least three spaced apart transmitting units for radiating position indicating signals of different frequency, means for heterodyning the signals radiated from a first and second of said units to develop a first beat frequency signal and for heterodyning the signals from the second and third of said units to develop a second beat frequency signal, means for transmitting to said mobile receiving unit first and second reference signals respectively derived from said first and second beat frequency signals, said transmitting means including at least one carrier wave generator for developing at least one of said position indicating signals, means for modulating the last named signal with said first reference signal to obtain only one side band while eliminating the other side band; means for radiating both said last named position indicating signal and said one side band, means for modulating the second reference signal upon one of the position indicating signals to obtain the last mentioned signal and only one of the side bands while the other side band is eliminated, all of said position indicating signals and the retained side bands falling within a single ten kilocycle frequency channel, and means at said mobile receiving unit jointly responsive to all three of said position indicating signals and to said remaining side band of each modulation component for providing a pair of position indications representative of the location of said mobile receiving unit relative to different pairs of said transmitting units.

24. A radio position finding system of the hyperbolic continuous wave type which comprises a mobile receiving unit, at least three spaced apart transmitting units for radiating position indicating signals of different frequency, means for heterodyning the signals radiated from a first and second of said units to develop a first beat frequency signal and for heterodyning the signals from the second and the third of said units to develop a second beat frequency signal, means for transmitting first and second reference signals respectively derived from said first and second beat frequency signals, said last named transmitting means including at least one wave signal generator for developing at least one of said position indicating signals, means for mixing the last named signal and said first reference signal to eliminate both said last named position indicating signal and the lower side band resulting from the mixing while retaining the upper side band, means including a carrier re-insertion circuit for radiating both said last named position indicating signal and said upper side band, means for modulating the second reference signal upon one of said position indicating signals to develop the last mentioned signal and its lower side band while eliminating the upper side band, all of said position indicating signals and the retained side bands having frequencies falling within a single ten kilocycle frequency channel, and means at the mobile receiving unit jointly responsive to all of said position indicating signals and to the retained side bands for providing a pair of position indications representative of the location of the mobile receiving unit relative to different pairs of transmitting units.

References Cited in the file of this patent

UNITED STATES PATENTS

| | | |
|---|---|---|
| 1,815,246 | Englund | July 21, 1931 |
| 2,098,307 | Purlington | Nov. 9, 1937 |
| 2,148,267 | Honore | Feb. 21, 1939 |
| 2,513,316 | Hawkins | July 4, 1950 |